United States Patent
Chu et al.

(10) Patent No.: US 6,519,136 B1
(45) Date of Patent: Feb. 11, 2003

(54) HYBRID DIELECTRIC MATERIAL AND HYBRID DIELECTRIC CAPACITOR

(75) Inventors: Peir Chu, Portland, OR (US); Steve Schiveley, Forest Grove, OR (US); Aaron J. Steyskal, Portland, OR (US); Mike Greenwood, Oregon City, OR (US); Tao Liu, University Place, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/108,563

(22) Filed: Mar. 29, 2002

(51) Int. Cl.[7] .................................................. H01G 4/06
(52) U.S. Cl. ......................................... 361/524; 361/311
(58) Field of Search ................................. 361/311, 312, 361/313, 524; 252/500

(56) References Cited

U.S. PATENT DOCUMENTS

| | | | | |
|---|---|---|---|---|
| 5,706,064 A | * | 1/1998 | Fukunaga et al. | 349/106 |
| 6,228,796 B1 | * | 5/2001 | Arakawa et al. | 428/325 |
| 6,277,304 B1 | * | 8/2001 | Wei et al. | 252/500 |
| 6,395,341 B1 | * | 5/2002 | Arakawa et al. | 427/407.1 |

* cited by examiner

*Primary Examiner*—Anthony Dinkins
(74) *Attorney, Agent, or Firm*—Antonelli, Terry, Stout & Kraus, LLP

(57) ABSTRACT

A dielectric hybrid material and a dielectric hybrid capacitor.

29 Claims, 1 Drawing Sheet

HYBRID DIELECTRIC MATERIAL AND HYBRID DIELECTRIC CAPACITOR

FIELD

Figure 1:
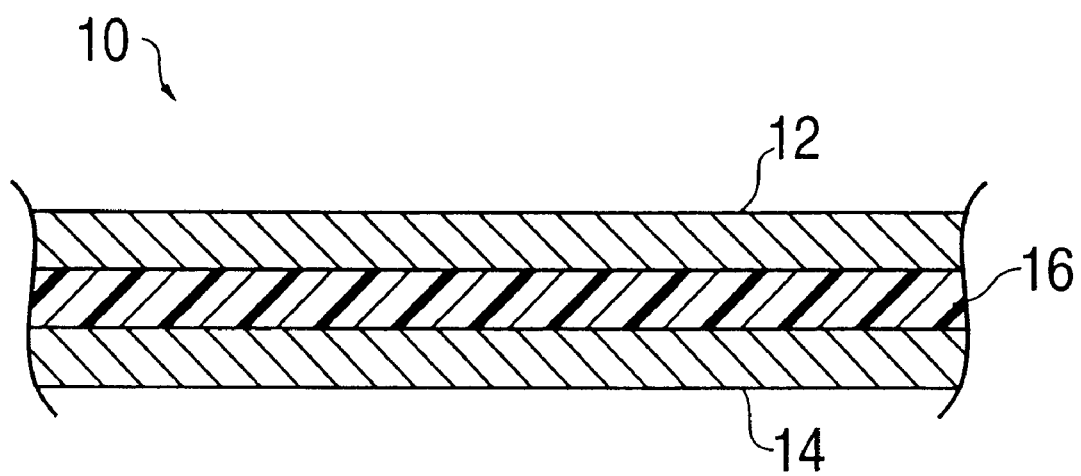

The present invention is directed to a hybrid dielectric material and a hybrid dielectric capacitor.

BACKGROUND

Capacitors are charge storage devices. They typically consist of two conducting electrodes and a layer of dielectric, insulating material located between the electrodes. When a battery or other voltage source is connected to a capacitor, polarization (charge separation) occurs in the dielectric layer, which develops a electric field across the capacitor, thereby storing a charge. When a charged capacitor is connected to a load device, discharge occurs.

The amount of charge that can be stored in a capacitor is determined by the following equation: $C = k\, e_0\, A/d$, where C=capacitance (in farads (F)), k=dielectric constant (the value of k depends on the dielectric property of the particular material that is used as the dielectric), $e_0$=permittivity of vacuum, A=total area of the electrodes, and d=distance (or separation) between the two electrodes.

Capacitors are commonly used as local charge reservoirs for microprocessors. As the speed of microprocessors continues to increase, greater demands are placed on the power supply and voltage regulator to keep up with increasing transient current and voltage stability needs. If the current and voltage needs are not met, the microprocessor may exhibit reduced performance or may shut down. In order to solve this problem, and in order to meet the transient current and voltage stability demands, capacitors are placed close to the CPU, typically on the die package and on the motherboard. As high frequency computing operation demands more current, during the fast transient conditions, a charge stored in the capacitors is released to the CPU before the voltage regulator can respond.

One commonly used type of capacitor is a multi-layer ceramic capacitor (MLCC), which contains an inorganic ceramic such $BaTiO_3$ as the dielectric material. A multi-layer ceramic capacitor has a high dielectric constant (up to 3000–4000) and can be prepared in a thin layer and a small form factor, which results in a significant performance enhancement. Today, multi-layer ceramic capacitors represent the largest sale among all capacitors. However, there are several disadvantages with multi-layer ceramic capacitors. The capacitance (dielectric constant) of $BaTiO_3$-based dielectric material changes greatly with changes in temperature and voltage (it can vary as much as +/−50%). $BaTiO_3$ is also a ferroelectric and piezoelectric material, which accounts for its relatively poor temperature and voltage performance. At high frequencies (above 1–10 GHz), $BaTiO_3$ exhibits a significant capacitance roll-off. Moreover, manufacturing and processing costs for capacitors based on powdered ceramics such as $BaTiO_3$ are high because high temperatures and laborious, time-consuming techniques such as tape casting and lamination are typically required.

Another commonly used type of capacitor is an organic polymer film capacitor, which uses an organic polymer as the dielectric material. Organic polymer film capacitors have advantages over multi-layer ceramic capacitors in that the organic polymer dielectric normally does not have ferroelectric nor piezoelectric properties, and therefore the dielectric constant has greater stability (better than 3–5%) under varying temperature, frequency and voltage conditions. In particular, organic polymer film capacitors are able to meet stringent capacitor tolerance conditions at high frequencies. Moreover, organic polymer film capacitors can be prepared at a lower temperature (less than 600–700° C. vs greater than 1000° C. for ceramic capacitors) using quicker and possibly less costly techniques such as physical vapor deposition (PVD), chemical vapor deposition (CVD), spin-on/pyrolysis, spray/pyrolysis and the like. Much thinner layers can be prepared with polymer dielectric material than with ceramic material (0.1 μm vs 1–2 μm for ceramic dielectrics), which increases the capacitance density. However, organic polymer film capacitors have the disadvantage that the dielectric constant of the organic polymer dielectric is usually small (less than 20). The low dielectric constant limits the total capacitance that an organic polymer film capacitor can achieve. The reason why the capacitance of organic polymer film dielectric capacitors is low is that there are four different dielectric polarization mechanisms which contribute to overall polarizability of a material: (i) electronic (ii) ionic (3) di-polar and (4) space charge. $BaTiO_3$-based dielectrics have all four mechanisms, and therefore, have a high dielectric constant. Organic polymer dielectrics, on the other hand, typically do not have di-polar polarization or ionic polarization, and therefore have a lower dielectric constant.

BRIEF DESCRIPTION OF THE DRAWING(S)

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The following represents brief descriptions of the drawing, wherein:

FIG. 1 is schematic sectional view of a capacitor of the present invention.

DETAILED DESCRIPTION

A capacitor that includes a hybrid dielectric material having the advantages of both an inorganic ceramic dielectric material and an organic polymer dielectric material is described. In the following description, numerous specific details are set forth in order to provide a thorough understanding of the present invention. It will be obvious, however, to one skilled in the art that the present invention can be practiced without these specific details. In other instances, some details have been omitted in order to avoid obscuring the present invention.

As used herein, the term "capacitor" refers to any device or structure having at least two electrodes and a solid dielectric material located between the electrodes so that the capacitor is capable of storing a charge. As shown schematically in FIG. 1, the capacitor 10 comprises electrodes 12 and 14, with the solid dielectric material 16 placed or deposited as a spacer or insulator between the electrodes. It is to be understood that the illustration of FIG. 1 is schematic only and that the capacitor of the present invention may be in any typical physical configuration of a capacitor, that is, any configuration wherein at least two electrodes are separated by a dielectric material.

In the present invention, it has been discovered that the advantages of inorganic ceramic dielectrics and organic polymer dielectrics discussed above can both be achieved by providing a capacitor in which the dielectric material of the capacitor is a hybrid dielectric polymer that includes both organic and inorganic substituents. The hybrid dielectric polymer is preferably one of two types: (1) a polymer having an organic polymer backbone and having inorganic functional groups attached to the organic polymer backbone as ligands, or (2) a polymer having an inorganic cross-linked backbone and having organic ligands attached to the inorganic cross-linked backbone. Both the polymer backbone and the attached ligands can be modified to meet particular performance goals, and the hybrid dielectric material may be crystalline or amorphous, depending on the performance goals. An amorphous hybrid dielectric material may result in a lower leakage current.

In the first type of dielectric material, the hybrid dielectric polymer has an organic polymer backbone and has inorganic functional groups attached to the organic polymer backbone as ligands. The organic polymer backbone can be any organic polymer, particularly, any organic polymer commonly used as a dielectric material in a capacitor, such as, for example, a film capacitor. Organic polymers that are commonly used as dielectric materials include, but are not limited to polyethylene, polypropylene, polystyrene and other polyolefins, polyesters, polysulfones, polyimides, polyamides, polyethylene naphthalate, polyphenylene sulfide, and similar material. The inorganic ligand comprises a metal element, preferably in the form of a metal oxide, metal alkoxide or metal aryloxide, or a metal having other organic ligands attached through an oxygen atom, that is covalently bound to the organic backbone, directly or indirectly, through an oxygen atom. Having a metal ligand attached to the organic polymer backbone of the organic polymer film dielectric gives the material the potential capability of di-polar and ionic polarization, thereby increasing its dielectric constant. It can also increase the electronic polarization due to the presence of the metal element. Any metal that achieves these effects may be used. Preferably, the metal is selected from the group consisting of Ti, Si, Al, Ta, Y, Zr, Hf and Ce.

In the most general terms, this embodiment of the dielectric material of the capacitor may be represented by the following chemical formula (1):

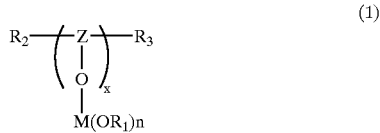

(1)

wherein Z is a repeating unit of an organic polymer, M is a metal atom, $R_1$ is H or an organic moiety, $R_2$ and $R_3$ are each independently H or an organic end group, n is an integer typically from 1 to 5 and x represents an average extent of polymerization and is a number greater than 1. As an example, M may be selected from the group consisting of Ti, Si, Al, Ta, Y, Zr, Hf and Ce. $R_1$, $R_2$ and $R_3$ independently may be H, an unsubstituted or halo-substituted alkyl group or an unsubstituted or halo-substituted aryl group, the alkyl group or aryl group having, for example, 10 or fewer carbon atoms. When more than one $OR_1$ group is attached to the metal, they can all be the same or they can different from each other.

The following guidelines may be used in the selection of Z, $R_1$, $R_2$, $R_3$, x, and n in the above formula (1): Typically, the selection of Z and x is made with reference to known organic polymer dielectric materials for which an increase in the dielectric constant is desired. For example, for a inorganic-organic hybrid polymer based on polystyrene, Z would represent individual styrene units each having an inorganic group attached in accordance with the present invention. As a further example, for an inorganic-organic hybrid polymer based on polyphenylene sulfide, Z would represent individual phenylene sulfide units, each having the inorganic group attached to the phenylene ring. Adding more carbon atoms in the structure of the above formula, in addition to providing the physical properties of the particular organic polymer obtained thereby, also affects the organic/inorganic ratio of the hybrid polymer. With larger or longer organic groups, the polymer behaves more like an organic polymer and the effect of the attached metal on physical properties such as the dielectric constant is lessened. Likewise, the number and size of $R_1$ groups attached to the metal atom affects the organic/inorganic ratio of the hybrid polymer, with more and larger groups lessening the overall effect of the metal atom.

This type of the dielectric material of the capacitor may be alternatively represented by the following chemical formula (2):

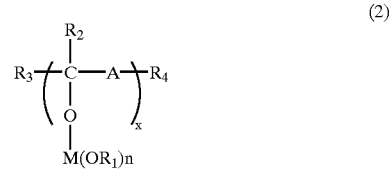

(2)

wherein A is a divalent organic radical, M is a metal atom, $R_1$ and $R_2$ are each independently H or an organic moiety, $R_3$ and $R_4$ are each independently H or an organic end group, n is an integer typically from 1 to 5 and x represents an average extent of polymerization and is a number greater than 1. For example, A can be alkylene or arylene, M can be selected from the group consisting of Ti, Si, Al, Ta, Y, Zr, Hf and Ce. $R_1$, $R_2$, $R_3$ and $R_4$ independently can be H, an unsubstituted or halo-substituted alkyl group or an unsubstituted or halo-substituted aryl group, the alkyl group or aryl group, for example, having 10 or fewer carbon atoms. When more than one $OR_1$ group is attached to the metal, they can all be the same, or they can different from each other. As a more specific, non-limiting example, A can be —$CH_2$—, —$C_2H_4$—, —$C_3H_6$— or —$C_4H_8$— and $R_1$, $R_2$, $R_3$ and $R_4$ independently can be H, —$CH_3$, —$C_2H_5$, —$C_3H_7$ or —$C_4H_9$. As a particular, non-limiting example, M can be Ti, $R_1$ can be $C_3H_7$, A can be $C_4H_8$, and $R_2$, $R_3$ and $R_4$ can be H.

The following guidelines may be used in the selection of A, $R_1$, $R_2$, x, and n in the above formula (2): Typically, the selection of A, $R_2$ and x is made with reference to known organic polymer dielectric materials for which an increase in the dielectric constant is desired. For example, for a inorganic-organic hybrid polymer based on polyethylene, A would be —$CH_2$— and $R_2$ would be H. Adding more carbon atoms in the structure of the above formula, by, for example, having A be an alkylene chain, arylene group, or a combination of alkylene and arylene, in addition to providing the physical properties of the particular organic polymer obtained thereby, also affects the organic/inorganic ratio of the hybrid polymer. With larger or longer organic groups, the polymer behaves more like an organic polymer and the effect of the attached metal on physical properties such as the dielectric constant is lessened. Likewise, the number and size of $R_1$ groups attached to the metal atom affects the organic/inorganic ratio of the hybrid polymer, with more and larger groups lessening the overall effect of the metal atom.

The hybrid polymer of the embodiment represented by formulas (1) and (2) may be synthesized by any known method of polymerization, particularly, by conventional methods of forming organic polymers from polymerizable monomers, with the added feature that the polymerizable monomers are first modified to have an inorganic group attached thereto.

The hybrid polymer having an organic polymer backbone may also be a copolymer formed by copolymerizing monomers that have and monomers that do not have attached inorganic groups. The monomers having attached inorganic groups may be of the same or a different type from the monomers that do not have attached inorganic groups. For example, ethylene may be polymerized with an inorganic group-substituted butylene. By controlling the ratio of monomers having attached inorganic groups and monomers not having attached inorganic groups, the relative inorganic/organic content of the hybrid polymer can be controlled.

In a second type of the hybrid dielectric polymer, the hybrid dielectric polymer has an inorganic cross-linked backbone with organic ligands, as represented by the following chemical formula (3):

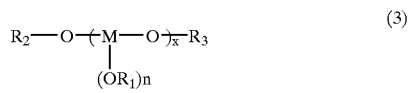

(3)

wherein M is a metal atom, $R_1$ is H or an organic moiety, $R_2$ and $R_3$ are independently H or an organic end group, n is an integer typically from 1 to 5 and x represents an average extent of polymerization and is a number greater than 1. For example, M can be selected from the group consisting of Ti, Al, Ta, Y, Zr, Hf, and Ce, and $R_1$, $R_2$ and $R_3$ independently can be H, an unsubstituted or halo-substituted alkyl group or an unsubstituted or halo-substituted aryl group, the alkyl group or aryl group having, for example, 10 or fewer carbon atoms. When more than one $OR_1$ group is attached to the metal, they can all be the same or they can be different from each other. As a more specific, non-limiting example, $R_1$, $R_2$ and $R_3$ can be H, —$CH_3$, —$C_2H_5$, or —$C_3H_7$. The number and size of the $OR_1$ groups attached to the metal atom affects the organic/inorganic ratio of the hybrid polymer, with more and larger groups increasing the organic character of the hybrid polymer and lessening the overall effect of the metal atom. As an even more specific, non-limiting example, M can be Ti, and $R_1$, $R_2$ and $R_3$ can be —$C_3H_7$.

This type of the dielectric material of the capacitor may be alternatively represented by the following chemical formula (4):

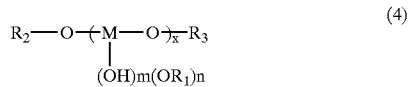

(4)

wherein M is a metal atom, $R_1$ is an organic moiety, $R_2$ and $R_3$ are H or organic end groups, m is an integer from 0 to 4, n is an integer from 1 to 5, m+n equals an integer from 1 to 5 and x represents an average extent of polymerization and is a number greater than 1. For example, M can be selected from the group consisting of Ti, Al, Ta, Y, Zr, Hf, and Ce; $R_1$ can be an unsubstituted or halo-substituted alkyl group or an unsubstituted or halo-substituted aryl group, the alkyl group or aryl group having, for example, 10 or fewer carbon atoms; and $R_2$ and $R_3$ independently can be H, an unsubstituted or halo-substituted alkyl group or an unsubstituted or halo-substituted aryl group, the alkyl group or aryl group having, for example, 10 or fewer carbon atoms. When more than one $OR_1$ group is attached to the metal, they can all be the same or they can be different from each other. As a more specific, non-limiting example, $R_1$ can be —$CH_3$, —$C_2H_5$, or —$C_3H_7$ and $R_2$ and $R_3$ can be H, —$CH_3$, —$C_2H_5$, or —$C_3H_7$. The number and size of the $OR_1$ groups attached to the metal atom affects the organic/inorganic ratio of the hybrid polymer, with more and larger groups increasing the organic character of the hybrid polymer and lessening the overall effect of the metal atom. As an even more specific, non-limiting example, M can be Ti, and $R_1$, $R_2$ and $R_3$ can be —$C_3H_7$ Hybrid polymers of this type of the hybrid dielectric polymer (for example, as represented by formulas (3) and (4)) are synthesized by crosslinking metal oxide monomers having the desired functional groups. For example, precursors that can be used as a starting material for making a hybrid polymer of this type of the hybrid dielectric polymer include the following non-limiting examples: $Ti(OC_3H_7)_4$, $Ta(OC_3H_7)_5$, $Zr(OC_3H_7)_4$ and $Si(OC_2H_5)_4$. The crosslinking reaction proceeds by partial hydrolysis of the alkoxide or other functional groups attached to the metal, followed by polycondensation of the partially hydrolyzed metal groups. For example, to form a titanium oxide polymer having propyloxide pendant groups, one may begin with $Ti(OC_3H_7)_4$ as the starting material, which can be partially hydrolyzed to $Ti(OC_3H_7)_3(OH)$ or $Ti(OC_3H_7)_2(OH)_2$, releasing $C_3H_7OH$. This reaction can be can be carried out, for example at 25° C. at a pH of 2–5. Two of the $Ti(OC_3H_7)_3$(OH) molecules can react with each other to form $Ti(OC_3H_7)_3$—O—$Ti(OC_3H_7)_3$, and polymerization can proceed with further hydrolysis to form longer chains. The extent of polymerization can be controlled by controlling variables such as the concentration of the reactant, the water content, pH and the temperature. For example, a greater extent of polymerization is promoted if the ratio of $H_2O$ to the precursor is greater than 2. The crosslinking reaction may be carried out in an organic solvent, such as alcohols, plus water. Other additives, such as an acid or a base, may be added to control the pH if needed. Typically, the reaction can be carried out at room temperature or at elevated temperature to accelerate the reaction, depending on the reactant used.

The hybrid dielectric material of the present invention may also be a polymer that is a combination of polymer chain that has an organic backbone and a polymer chain that has an inorganic backbones. For example, metal oxide monomers as described above may be copolymerized with monomers for an organic polymer such as a polyester (PET), a polyethylene naphthalate (PEN), polypropylene (PP) or polyphenylene sulfide (PPS) to form a hybrid material. The hybrid dielectric materials described above may be used as a dielectric in a capacitor of any configuration known in the art that uses a solid dielectric, including, for example, a multilayer capacitor or wound-roll capacitor. Typically, a capacitor may be formed by depositing a dielectric material as a layer of film onto a first electrode layer and then depositing the second electrode onto the dielectric layer. However, other variations are possible as is known in the art. The hybrid dielectric polymer of the present invention is particularly suited for any type of capacitor wherein the dielectric material is deposited as a layer because, due to the organic character of the hybrid material, deposition of the hybrid dielectric polymer may be carried out by methods currently used for depositing organic polymers. Such methods include, but are not limited to, physical vapor deposition (PVD), chemical vapor deposition (CVD), spin-on/pyrolysis and spray/pyrolysis.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A capacitor comprising:
  a first conducting electrode;
  a second conducting electrode; and
  a solid dielectric material between the first and second electrode, wherein the solid dielectric material is an organic-inorganic hybrid polymer.

2. The capacitor of claim 1 wherein the organic-inorganic hybrid polymer has an organic polymer backbone with inorganic ligands attached to the organic backbone.

3. The capacitor of claim 1 wherein organic-inorganic hybrid polymer has an inorganic crosslinked backbone with organic ligands attached to the inorganic backbone.

4. The capacitor of claim 1 wherein the dielectric material is in the form of a film deposited on a substrate.

5. The capacitor of claim 4 wherein the film has a thickness of less than 1.0 μm.

6. The capacitor of claim 4 wherein the film is deposited on the substrate by a deposition method selected from the group consisting of physical vapor deposition (PVD), chemical vapor deposition (CVD), spin-on/pyrolysis and spray/pyrolysis.

7. A capacitor comprising:
  a first conducting electrode;
  a second conducting electrode; and
  a solid dielectric material between the first and second electrode, wherein the solid dielectric material is an organic-inorganic hybrid polymer represented by the following chemical formula (1):

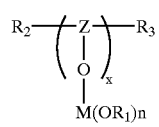

(1)

wherein Z is a repeating unit of an organic polymer, M is a metal atom, $R_1$ is H or an organic moiety, $R_2$ and $R_3$ are independently H or an organic end group, n is an integer from 1 to 5 and x represents an average extent of polymerization and is a number greater than 1.

8. The capacitor of claim 7 wherein M is a metal atom selected from the group consisting of Ti, Si, Al, Ta, Y, Zr, Hf and Ce.

9. The capacitor of claim 7 wherein $R_1$ is H, an unsubstituted or halo-substituted alkyl group or an unsubstituted or halo-substituted aryl group.

10. The capacitor of claim 7 wherein $R_2$ and $R_3$ are H, an unsubstituted or halo-substituted alkyl group or an unsubstituted or halo-substituted aryl group.

11. A capacitor comprising:
  a first conducting electrode;
  a second conducting electrode; and
  a solid dielectric material between the first and second electrode, wherein the solid dielectric material is an organic-inorganic hybrid polymer represented by the following chemical formula (2):

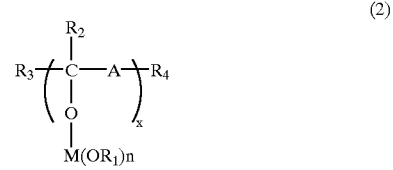

(2)

wherein A is a divalent organic radical, M is a metal atom, $R_1$ and $R_2$ are each independently H or an organic moiety, $R_3$ and $R_4$ are each independently H or an organic end group, n is an integer from 1 to 5 and x represents an average extent of polymerization and is a number greater than 1.

12. The capacitor of claim 11 wherein M is a metal atom selected from the group consisting of Ti, Si, Al, Ta, Y, Zr, Hf and Ce.

13. The capacitor of claim 11 wherein A is an unsubstituted or halo-substituted alkylene or arylene group.

14. The capacitor of claim 11 wherein $R_1$ is H, an unsubstituted or halo-substituted alkyl group or an unsubstituted or halo-substituted aryl group.

15. The capacitor of claim 11 wherein $R_2$, $R_3$ and $R_4$ are independently H, an unsubstituted or halo-substituted alkyl group or an unsubstituted or halo-substituted aryl group.

16. The capacitor of claim 11 wherein A is —$CH_2$—, —$C_2H_4$—, —$C_3H_6$—, or $C_4H_8$ and $R_1$, $R_2$, $R_3$ and $R_4$ are independently H, —$CH_3$, —$C_2H_5$, —$C_3H_7$ or $C_4C_9$.

17. A capacitor comprising:
  a first conducting electrode;
  a second conducting electrode; and
  a solid dielectric material between the first and second electrode, wherein the solid dielectric material is an organic-inorganic hybrid polymer represented by the formula (3):

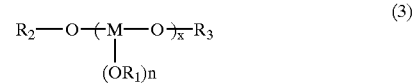

(3)

wherein M is a metal atom, $R_1$ is H or an organic moiety, $R_2$ and $R_3$ are H or organic end groups, n is an integer from 1 to 5 and x represents an average extent of polymerization and is a number greater than 1.

18. The capacitor of claim 17 wherein M is selected from the group consisting of Ti, Al, Ta, Y, Zr, Hf and Ce.

19. The capacitor of claim 17 wherein $R_1$, $R_2$ and $R_3$ are independently H, an unsubstituted or halo-substituted alkyl group or an unsubstituted or halo-substituted aryl group.

20. A capacitor comprising:
  a first conducting electrode;
  a second conducting electrode; and
  a solid dielectric material between the first and second electrode, wherein the solid dielectric material is an organic-inorganic hybrid polymer represented by the following chemical formula (4):

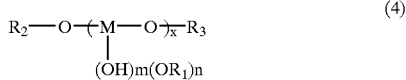

wherein M is a metal atom, $R_1$ is an organic moiety, $R_2$ and $R_3$ are H or organic end groups, m is an integer from 0 to 4, n is an integer from 1 to 5, m+n equals an integer from 1 to 5 and x represents an average extent of polymerization and is a number greater than 1.

21. The capacitor of claim 20 wherein M is selected from the group consisting of Ti, Al, Ta, Y, Zr, Hf, and Ce; $R_1$ is an unsubstituted or halo-substituted alkyl group or an unsubstituted or halo-substituted aryl group and $R_2$ and $R_3$ independently are H, an unsubstituted or halo-substituted alkyl group or an unsubstituted or halo-substituted aryl group.

22. A dielectric material comprising an organic-inorganic hybrid polymer represented by the following chemical formula (1):

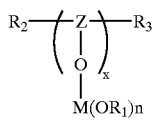

wherein Z is a repeating unit of an organic polymer, M is a metal atom, $R_1$ is H or an organic moiety, $R_2$ and $R_3$ are H or organic end groups, n is an integer from 1 to 5 and x represents an average extent of polymerization and is a number greater than 1.

23. The dielectric material of claim 22 wherein M is a metal atom selected from the group consisting of Ti, Si, Al, Ta, Y, Zr, Hf and Ce and $R_1$, $R_2$ and $R_3$ are each independently H, an unsubstituted or halo-substituted alkyl group or an unsubstituted or halo-substituted aryl group.

24. A dielectric material comprising an organic-inorganic hybrid polymer represented by the following chemical formula (2):

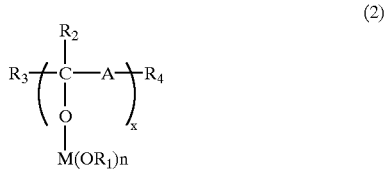

wherein A is a divalent organic radical, M is a metal atom, $R_1$ and $R_2$ are each independently H or an organic moiety, $R_3$ and $R_4$ are each independently H or an organic end group, n is an integer from 1 to 5 and x represents an average extent of polymerization and is a number greater than 1.

25. The dielectric material of claim 24 wherein M is a metal atom selected from the group consisting of Ti, Si, Al, Ta, Y, Zr, Hf and Ce, A is an unsubstituted or halo-substituted alkylene or arylene group, and $R_1$ $R_2$, $R_3$ and $R_4$ are independently H, an unsubstituted or halo-substituted alkyl group or an unsubstituted or halo-substituted aryl group.

26. A dielectric material comprising an organic-inorganic hybrid polymer represented by the formula (3):

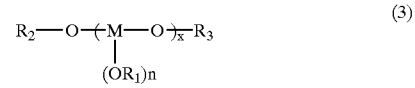

wherein M is a metal atom, $R_1$ is H or an organic moiety, $R_2$ and $R_3$ are each independently H or an organic end group, n is an integer from 1 to 5 and x represents an average extent of polymerization and is a number greater than 1.

27. The dielectric material of claim 26 wherein M is selected from the group consisting of Ti, Al, Ta, Y, Zr, Hf and Ce, and $R_1$, $R_2$ and $R_3$ are independently H, an unsubstituted or halo-substituted alkyl group or an unsubstituted or halo-substituted aryl group.

28. A dielectric material comprising an organic-inorganic hybrid polymer represented by the following chemical formula (4):

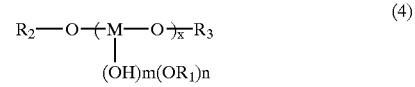

wherein M is a metal atom, $R_1$ is an organic moiety, $R_2$ and $R_3$ are H or organic end groups, m is an integer from 0 to 4, n is an integer from 1 to 5, m+n equals an integer from 1 to 5 and x represents an average extent of polymerization and is a number greater than 1.

29. The capacitor of claim 28 wherein M is selected from the group consisting of Ti, Al, Ta, Y, Zr, Hf, and Ce; $R_1$ is an unsubstituted or halo-substituted alkyl group or an unsubstituted or halo-substituted aryl group; and $R_2$ and $R_3$ independently are H, an unsubstituted or halo-substituted alkyl group or an unsubstituted or halo-substituted aryl group.

* * * * *